United States Patent [19]
Blaisdell et al.

[11] Patent Number: 5,086,249
[45] Date of Patent: Feb. 4, 1992

[54] COMPACT DISCHARGE LAMP UNIT AND METHOD FOR MANUFACTURING SAME

[75] Inventors: Ronald G. Blaisdell, Saugus; Harold L. Hough, Beverly, both of Mass.

[73] Assignee: GTE Products Corporation, Danvers, Mass.

[21] Appl. No.: 664,250

[22] Filed: Mar. 4, 1991

[51] Int. Cl.⁵ .......................... H01J 61/30; H01J 9/34
[52] U.S. Cl. ................................. 313/318; 313/493; 313/634; 439/227; 439/611; 445/26
[58] Field of Search ................. 313/318, 493, 634; 439/611–615, 226–227; 445/26

[56] References Cited

U.S. PATENT DOCUMENTS

| | | | |
|---|---|---|---|
| 4,654,557 | 3/1987 | Haraden | 313/318 |
| 4,695,767 | 9/1987 | Wittmann | 313/493 X |
| 4,738,630 | 4/1988 | Wittmann | 313/318 X |
| 4,847,531 | 7/1989 | Tsuji et al. | 313/318 |
| 4,862,035 | 8/1989 | Cunliffe et al. | 315/211 |
| 4,961,027 | 10/1990 | Muessli | 315/58 |

FOREIGN PATENT DOCUMENTS 0346782  12/1989  France .

*Primary Examiner*—Palmer C. DeMeo
*Attorney, Agent, or Firm*—Carlo S. Bessone

[57] ABSTRACT

A compact fluorescent lamp unit comprises a double U-shaped discharge tube having a base shell secured to one end thereof. A housing containing the necessary starting and operating circuitry includes a first portion having a standardized base and a second portion surrounding the base shell of the discharge tube. The internal surface of the second housing portion includes a plurality of flexible fingers for securing the base shell to the second portion of the housing. in a preferred embodiment, each flexible finger includes a latch for engaging the base shell. Preferably, the the internal surface of second housing portion further inlcudes a plurality of support ribs for preventing or limiting lateral movement of the base shell within the housing.

7 Claims, 3 Drawing Sheets

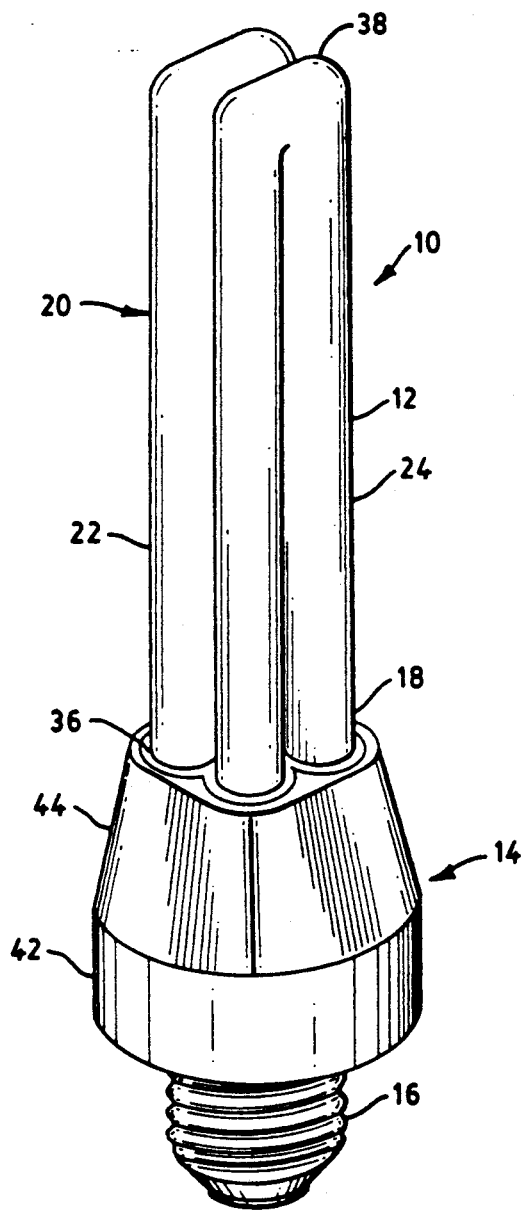
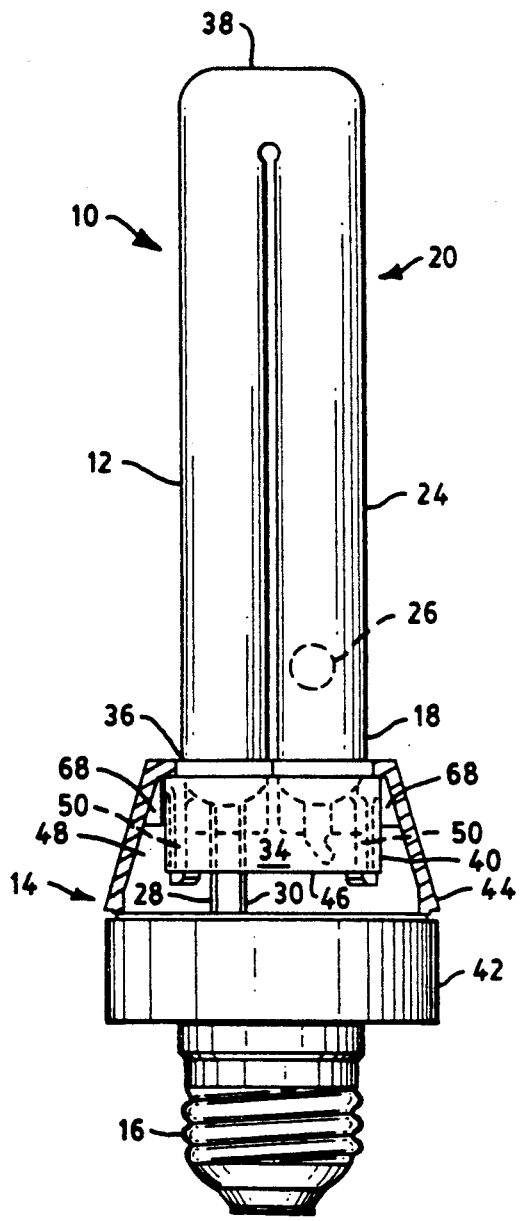
FIG. 1
FIG. 2

COMPACT DISCHARGE LAMP UNIT AND METHOD FOR MANUFACTURING SAME

FIELD OF THE INVENTION

This invention relates in general to low-pressure discharge lamps, and, more particularly, to so-called compact fluorescent lamp units that are intended to be used as direct replacements for the conventional incandescent lamps.

BACKGROUND OF THE INVENTION

Because of the increasing cost of electrical energy during the past decade, efforts have been made to substitute initially costlier but more energy efficient lamp types in place of incandescent lamps. There have been proposed lamp units which comprise a compact fluorescent discharge lamp or tube coupled respectively in a detachable or non-detachable manner to a housing which contains the lamp operating circuitry. The lamp operating circuitry may consist of, for example, an inductive ballast or an electronic circuit, the latter of which transforms the AC input signal into a high frequency. These lamp units have a standardized base for instance of the screw-in or bayonet type which can be directly inserted into a standardized socket.

An example of a compact fluorescent discharge lamp adapted for coupling in a detachable manner to a housing containing the lamp starting and operating circuitry is shown, for example, in U.S. Pat. No. 4,862,035 (Cunliffe et al). In FIG. 1 of the Cunliffe et al patent there is illustrated an example of a commercially available compact fluorescent lamp comprising two adjacent U-shaped tubes connected together to form an assembly 10. A jointing connection 12 provides a communication between the two tubes so that a single folded arc discharge path is provided through the two U-shaped tubes, via the joint 12. Each of the U-shaped tubes is provided with a corresponding filament at each end of the arc discharge path, only one such filament 14 being illustrated in the drawing.

The double twin-tube bulb 10 in the Cunliffe et al patent is supported in a two-part base that is comprised of an upper base shell 20 and a lower base bottom 22. The double twin-tube bulb 10 is secured in the upper base shell 20 by means of an appropriate cement such as illustrated at 24 in FIG. 1. In order to withstand the high temperatures required to cure typical basing cements, the base shell 20 is often constructed from a thermoplastic polyester material.

Base bottom 22 supports pins 26 and 28 and contains the starter circuit which consists of a glow bottle starter switch 30 and capacitor 32. The base bottom 22 and the pins 26 and 28 are adapted to form a plug connection capable of being electrically connected to a base fitting (sometime referred to as a lamp holder or adapter) that incorporates the associated lamp operating circuitry and has the standardized base required for insertion into an electrical socket intended to receive a conventional incandescent lamp. A commercially available lamp holder suitable for receiving such a replaceable compact fluorescent lamp as described above is similar to that shown in FIG. 1 of U.S. Pat. No. 4,654,557 (Haraden). Since the discharge tube in a replaceable lamp unit is not cemented to the housing of the fitting, the housing can be constructed from a material which is less expensive than thermoplastic polyester.

An example of an integral compact fluorescent lamp unit wherein the discharge tube in not detachable from the housing containing the lamp starting and operating circuitry is discussed, for example, in French Publication No. 0346782. Reference is made to FIG. 6 wherein a discharge tube having two branches 6 and 7 is sealed by means of cement 18 to the interior of an intermediate element (i.e., housing) 9. A conventional screw base 10 is fastened to the intermediate element. In order to withstand the high temperatures required to cure a conventional basing cement, this intermediate element must be constructed from a material which can withstand the cement's curing temperature. This material may be the same as that typically used for the lamp base shell discussed above.

Equipment is presently being used by lamp manufacturers to produce replaceable compact fluorescent lamps similar to those illustrated in FIG. 1 of the Cunliffe et al patent. In the process, an inventory of partially assembled lamps, consisting of discharge tubes cemented to upper base shells but not including the starting circuitry and lower base bottoms, may exist.

To be able to produce an integral compact fluorescent lamp unit, it is desirable from a manufacturing standpoint to be able to use as much of the previously available manufacturing equipment as possible as well as being able to use these partially assembled discharge tubes. Moreover, it is desirable to be able to manufacture an integral compact fluorescent unit wherein the unit housing, which may contain the lamp starting and operating circuitry, can be produced from a less expensive material.

SUMMARY OF THE INVENTION

It is, therefore, an object of the present invention to obviate the disadvantages of the prior art.

It is still another object of the invention to provide an improved discharge lamp unit and a method for manufacturing the unit.

It is another object of the invention to provide a discharge lamp unit using previously available manufacturing equipment and partially assembled discharge tubes.

It is still another object of the invention to provide a discharge lamp unit wherein the unit housing can be produced from relatively inexpensive materials.

These objects are accomplished in one aspect of the invention by the provision of discharge lamp unit comprising a discharge tube having a base shell secured at one end thereof. The base shell includes a collar having a rim. A housing which defines a cavity therewithin comprises a first portion having a standardized base electrically coupled to the discharge tube and a second housing portion having an aperture formed therein for receiving the discharge tube. Means is provided within the housing cavity for securing the base shell of the discharge tube to the second housing portion. The securing means comprises a plurality of flexible fingers secured to or formed from the second housing portion.

In accordance with further teachings of the present invention, the flexible fingers include a free end and a fixed end. The free end has latch means extending therefrom for engaging the rim of the base shell. Preferably, the latch means includes an angled leading surface.

In accordance with another aspect of the present invention, the second housing portion includes means for limiting or preventing lateral movement of the base shell within the second housing portion. In a preferred embodiment, a plurality of ribs protruding from the inner surface of the second housing portion is provided.

The above objects are accomplished in another aspect of the invention by the provision of a method for manufacturing a discharge lamp unit. The method includes the steps of providing a discharge tube having a sealed end portion and a remote end, and providing a base shell including a collar having a rim. The base shell is secured to the sealed end portion of the discharge tube, for example, by means of a basing cement. A first housing portion having an aperture formed therein for receiving the discharge tube and means for securing the base shell of the discharge tube to the first housing portion are provided. The securing means comprises a plurality of flexible fingers secured to or formed from the first housing portion. After the base shell is secured to the discharge tube, the remote end of the discharge tube is inserted through the aperture in the first housing portion until the flexible fingers secure the base shell to the first housing portion. A second housing portion having a standardized base secured thereto is provided. The discharge tube is electrically coupled to the standardized base. Finally, the first and second housing portions are attached together.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying drawing, wherein:

FIG. 1 is a perspective view of a compact fluorescent lamp unit in accordance with the teachings of the present invention;

FIG. 2 is a side elevational view of the compact fluorescent lamp unit of FIG. 1 wherein the upper portion of the housing is shown broken away;

BEST MODE FOR CARRYING OUT THE INVENTION

Figure 3:
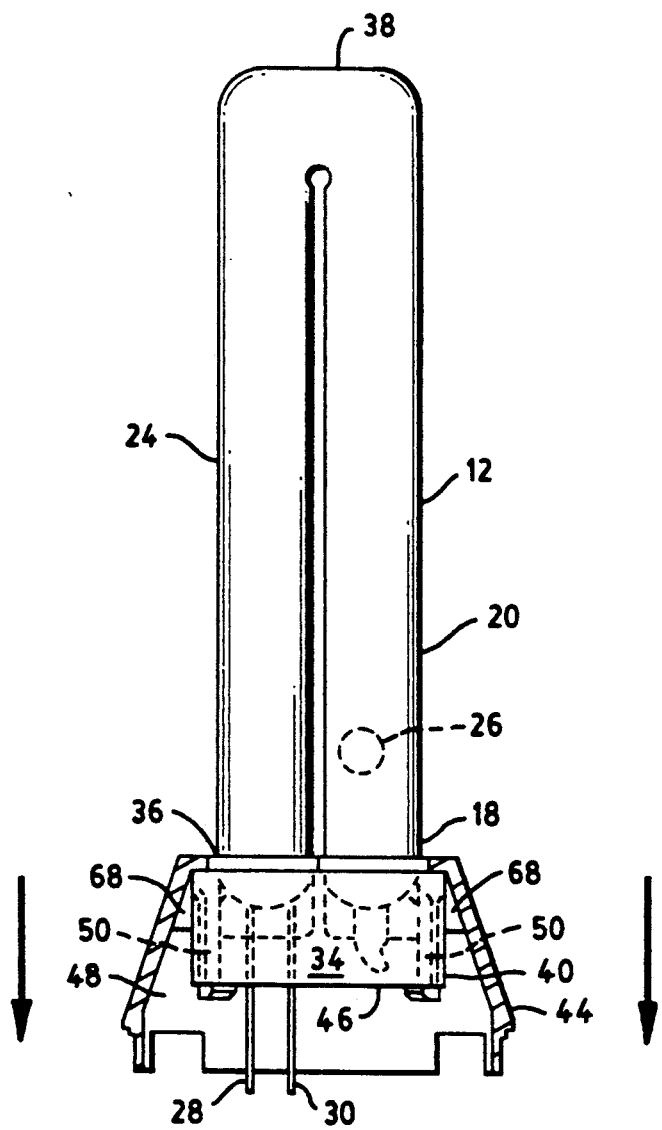
FIG. 3 is a side elevational view of the discharge tube, the upper housing portion shown in cross-section and the base shell.

For a better understanding of the present invention, together with other and further objects, advantages and capabilities thereof, reference is made to the following disclosure and appended claims in connection with the above-described drawings.

Referring now to the drawings with greater particularity to FIGS. 1 and 2, there is illustrated a compact fluorescent lamp unit 10 comprising a fluorescent discharge tube 12 supported by a housing 14 having a standardized base 16, such as a conventional Edison screw-in base, disposed at one end of the housing. Housing 14 may contain starting and operating circuitry (not shown) which electrically couples base 16 to the lead-in wires of discharge tube 12.

Discharge tube 12 may comprise an envelope 20 including two adjacent U-shaped tubes 22, 24 connected together by a jointing connection 26 which provides a communication between the two tubes so that a single folded arc discharge path is provided through the two U-shaped tubes, via the joint 26. Each of the U-shaped tubes is provided with a corresponding electrode (not shown) at each end of the arc discharge path. Each electrode is supported by a pair of lead-in wires 28, 30 which are sealed to envelope 20.

Envelope 20 is typically constructed from light-transmitting vitreous material such as soda-lime or lead glass and contains an ionizable medium including a quantity of mercury and an inert starting gas at a low pressure, for example, in the order of 1-5 mm of mercury. The starting gas can be, for example, argon, krypton, neon, or helium, or a mixture of these and other gases. A phosphor layer (not shown), which converts ultraviolet radiation generated in the mercury discharge into visible radiation, is disposed on the internal surface of the envelope 20.

Figure 4:
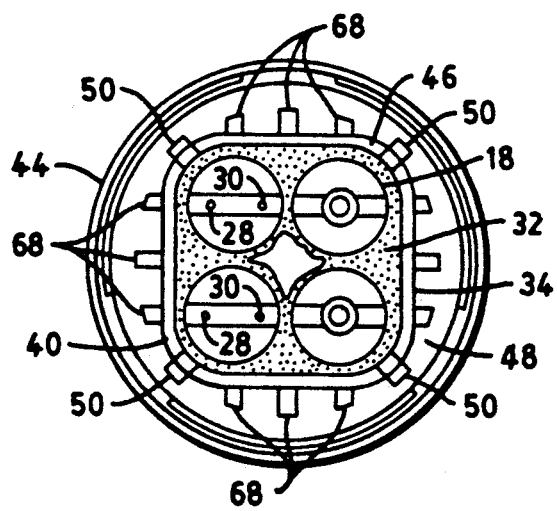
FIG. 4 is a bottom plan view of the discharge tube, upper housing portion and base shell of FIG. 3.

In FIGS. 2, 3 and 4, a base cap or shell 34 is attached to the sealed end portion 18 of discharge tube 12. Base shell 34 includes an opening 36 adequate in size to receive discharge tube 12, and a collar 40 surrounding the sealed end portion of the discharge tube. It should be noted that base shell 34 does not support any electrical terminals or pins. In the embodiment shown in FIG. 4, collar 40 has a substantially square shape. If discharge tube 12 consists of a single U-shaped tube, collar 40 will have a generally rectangular shape. The lower portion of collar 40 is provided with a rim 46 on the lower surface thereof. Terms such as "lower", "upper", "vertical" and "horizontal" are used throughout the application with reference to a lamp unit in a base-down orientation as depicted in FIG. 2.

As illustrated in FIG. 4, the sealed end portion of discharge tube 12 is secured to base shell 34 by means of a conventional basing cement 32. In order to withstand the high temperatures required to cure such cements, base shell 34 is constructed from a conventional thermoplastic polyester material.

As shown in FIGS. 1 and 2, housing 14 of the lamp unit consist of two parts, a lower portion 40 and an upper portion 42. Housing portions 42 and 44 are secured together, for example, by a snap fit so as to form a cavity 48 therewithin. Starting and operating circuitry (not shown) may be disposed within a cavity 48 created by housing portions 42 and 44 and electrically couples discharge tube 12 to a base 16. Base 16, which may be a conventional Edison screw-in type, is secured in a conventional manner to lower portion 42 of housing 14.

In accordance with the teachings of the present invention, discharge tube 12 is retained by and secured to upper housing portion 44 by means of a plurality of flexible fingers 50 as shown in FIGS. 2-7. Flexible fingers 50 provide an upward force on the base shell so that the upper portion of the base shell is in a contiguous relationship with the uppermost inner surface of upper housing portion 44. The flexible fingers also provide a degree of lateral support to the base shell.

Figure 5:
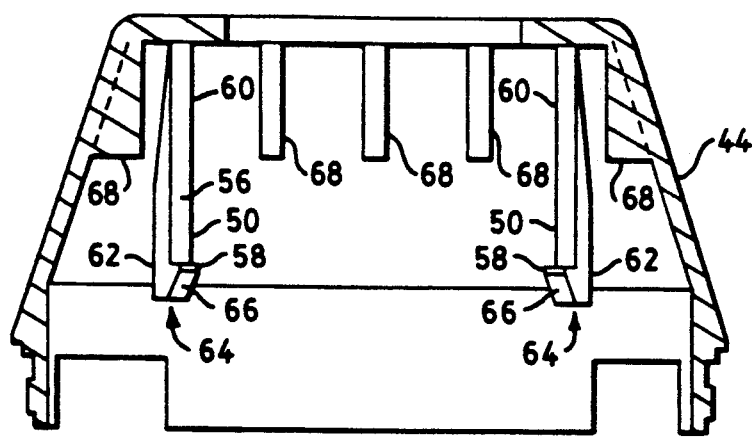
FIG. 5 is an enlarged cross-sectional view of the upper housing portion showing the flexible fingers and supporting ribs.
Figure 6:
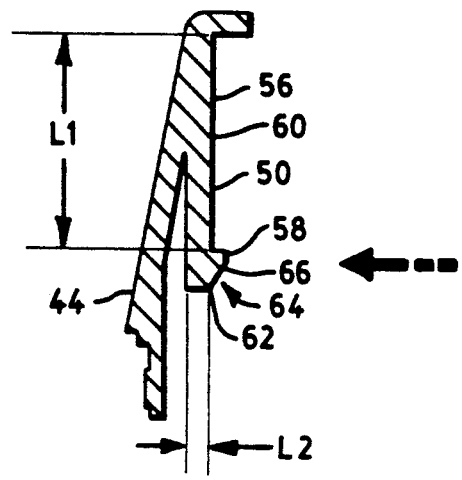
FIG. 6 is an enlarged cross-sectional partial view of one of the flexible fingers formed from the upper housing portion.

As best illustrated in FIGS. 5 and 6, each flexible finger 50 has a fixed end 60 and a free end 62. Fixed end 60 of flexible finger 50 protrudes from the inner surface of upper housing portion 44. Preferably, the flexible fingers are formed directly from the material of the upper housing portion. In a preferred embodiment as illustrated by FIG. 4, upper housing portion 44 contains four flexible fingers 50. One flexible finger is associated with each corner of square-shaped collar 40 of base shell 34.

Free end 62 of each flexible finger 50 is adapted to engage and vertically retain rim 46 which surrounds collar 40 of the base shell. As best shown in the magnified view of FIG. 7, free end 62 is formed with a latch portion 64 which clamps to rim 46. Latch portion 64 has an outer surface 58 and includes an angled leading surface 66 formed therein. A force (FIG. 6) on free end 62 causes an inward deflection of the flexible fingers.

With particular attention to FIGS. 2, 3, 4 and 5, upper housing portion 44 may contain a plurality of longitudinally-extending ribs 68. Ribs 68 protrude from the inner surface of upper housing portion 44 and provide horizontal support to prevent or otherwise limit lateral movement of the base shell within the upper portion of the housing depending upon the clearance between the ribs and the base shell. In a preferred embodiment as illustrated in FIG. 4, ribs 68 are circumferentially disposed around collar 40 of base shell 34.

During assembly of the lamp unit, base shell 34 is secured to discharge tube 12 by means of a basing cement. Thereafter, upper housing portion 44 is slipped down in the direction of the movement arrows shown in FIG. 3 over the remote end 38 of discharge tube 12. Since the distance between opposing flexible fingers, as measured between respective outer latch surfaces 58, is smaller than the diagonal width of base shell 34, free end 62 of each finger is forced inward (FIG. 6) as leading surface 66 of latch portion 64 contacts the base shell. Thereafter, outer surface 58 of latch portion 64 slides along the outer surface of the base shell during assembly until latch portion 64 is brought into engagement with the rim of the base shell. The distance between opposing flexible fingers, as measured between surfaces 56, approximates the diameter of the base shell.

To complete the assembly, the discharge tube is electrically coupled to standardized base 16 of the lower housing portion 42. Finally, the upper and lower housing portions are attached together, for example, by a snap fit.

Since the discharge tube is not cemented directly to the unit housing, equipment necessary to properly hold and align the discharge tube and the unit housing before applying basing cement to secure the tube to the housing is unnecessary.

Figure 7:
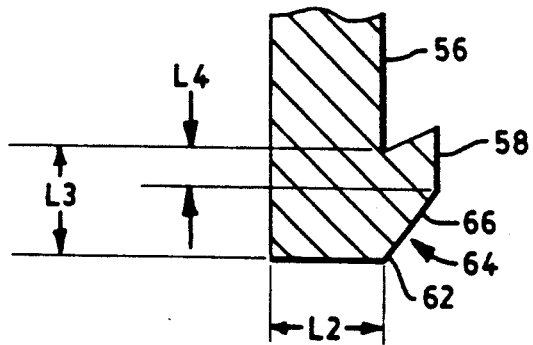
FIG. 7 is a magnified cross-sectional partial view of the latch portion of the flexible finger of FIG. 6.

In a practical example of an embodiment of the invention, the inner surface of the upper portion of the housing contains four sets of three ribs disposed as shown in FIG. 4. Each rib has a length of approximately 0.375 inch. The clearance between each rib and the outer surface of the base shell is between 0.002 to 0.005 inch. Four flexible fingers are provided, each of which is associated with a corner of a square-shaped collar of a base shell. With attention to FIGS. 6 and 7, each of the flexible fingers has a length L1 of 0.625 inch, and a width L2 of 0.062 inch. A latch located at the free end of each flexible finger has a general cross-sectional shape as best shown in FIG. 7. The length of the latch portion, as defined by L3, is 0.062 inch. Distance L4 is 0.020 inch. The distance between the outer latch surfaces of two opposing flexible fingers is approximately 0.060 inch less than the diagonal width of the base shell. The two-part housing, flexible fingers and supporting ribs are made from a polycarbonate material. One suitable material is Lexan #940 available from General Electric. The base shell is made from a thermoplastic polyester material such as Valox #420SEO which is available from General Electric or Pocan B-4235 which is available from Mobay.

There has thus been shown and described an improved discharge lamp unit and a method for manufacturing the unit. The invention allows lamp manufacturers to produce an integral compact fluorescent unit using some of the previously available manufacturing equipment along with partially assembled discharge tubes. In addition, the present invention allows the unit housing to be made from a less expensive material.

While there have been shown and described what are at present considered to be the preferred embodiments of the invention, it will be apparent to those skilled in the art that various changes and modifications can be made herein without departing from the scope of the invention. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A discharge lamp unit comprising;
   a discharge tube having a base shell secured to one end thereof, said base shell including a collar having a rim,
   a housing defining a cavity and comprising a first portion having a standardized base electrically coupled to said discharge tube and a second portion having an aperture formed therein for receiving said discharge tube; and
   means within said cavity of said housing for securing said base shell of said discharge tube to said second portion of said housing, said securing means comprising a plurality of flexible fingers secured to or formed from said second portion of said housing.

2. The discharge lamp unit of claim 1 wherein said flexible fingers include a free end and a fixed end, said free end having latch means extending therefrom for engaging said rim of said collar of said base shell.

3. The discharge lamp of claim 2 wherein said latch means includes an angled leading surface.

4. The discharge lamp of claim 1 wherein the number of flexible fingers is four.

5. The discharge lamp of claim 1 wherein said second housing portion includes means for limiting or preventing lateral movement of said base shell within said second housing portion.

6. The discharge lamp unit of claim 5 wherein said means for limiting or preventing lateral movement includes a plurality of ribs protruding from the inner surface of said second housing portion.

7. A method for manufacturing a discharge lamp unit comprising the steps of:
   providing a discharge tube having a sealed end portion and a remote end;
   providing a base shell including a collar having a rim;

securing said base shell to said sealed end portion of said discharge tube;

providing a first housing portion having an aperture formed therein for receiving said discharge tube and having means for securing said base shell of said discharge tube to said first housing portion, said securing means comprising a plurality of flexible fingers secured to or formed from said first housing portion;

after said base shell is secured to said discharge tube, inserting said remote end of said discharge tube through said aperture in said first housing portion until said flexible fingers secure said base shell to said first housing portion;

providing a second housing portion having a standardized base secured thereto;

electrically coupling said discharge tube to said standardized base; and attaching together said first and second housing portions.

* * * * *